United States Patent
Kawanabe (10) Patent No.: US 7,054,397 B1
(45) Date of Patent: May 30, 2006

(54) MOBILE COMMUNICATION SYSTEM HAVING MOBILE STATIONS AND A BASE STATION

(75) Inventor: Yoshitaka Kawanabe, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/497,513

(22) Filed: Feb. 4, 2000

(30) Foreign Application Priority Data

Feb. 5, 1999 (JP) .................................. 11-029336
Jul. 8, 1999 (JP) .................................. 11-193960

(51) Int. Cl.
*H04B 7/10* (2006.01)
*H04B 1/707* (2006.01)
*H04B 17/02* (2006.01)

(52) U.S. Cl. ........................ 375/347; 375/148; 455/137
(58) Field of Classification Search ................ 375/147, 375/148, 149, 150, 267, 347; 455/132–138; 370/335, 342, 441
See application file for complete search history.

(56) References Cited

U.S. PATENT DOCUMENTS

| | | | |
|---|---|---|---|
| 4,715,048 A | 12/1987 | Masamura | |
| 4,956,864 A * | 9/1990 | Brockman | .................... 380/34 |
| 5,179,728 A * | 1/1993 | Sowadski | ................ 455/183.1 |
| 5,592,490 A | 1/1997 | Barratt et al. | |
| 5,710,977 A * | 1/1998 | Nakazawa | .................... 455/65 |
| 5,742,583 A * | 4/1998 | Scott | ........................... 370/342 |
| 5,809,087 A * | 9/1998 | Ashe et al. | ................. 375/340 |
| 5,826,170 A * | 10/1998 | Hirschfield et al. | ......... 455/13.4 |
| 5,859,842 A | 1/1999 | Scott | |
| 5,881,057 A * | 3/1999 | Komatsu | .................... 375/148 |
| 5,910,948 A * | 6/1999 | Shou et al. | ................. 375/150 |
| 5,963,586 A * | 10/1999 | Durrant et al. | ............. 375/142 |
| 5,966,095 A * | 10/1999 | Hiramatsu et al. | .......... 342/383 |
| 6,069,583 A * | 5/2000 | Silvestrin et al. | ....... 342/357.01 |
| 6,172,970 B1 * | 1/2001 | Ling et al. | ................... 370/347 |
| 6,233,459 B1 * | 5/2001 | Sullivan et al. | ............. 375/149 |
| 6,400,318 B1 * | 6/2002 | Kasami et al. | .............. 342/383 |
| 6,449,469 B1 * | 9/2002 | Miyahara | .................... 455/273 |

FOREIGN PATENT DOCUMENTS

| | | |
|---|---|---|
| JP | 6-242229 | 9/1994 |
| JP | 8-172312 | 7/1996 |
| JP | 10-70502 | 3/1998 |
| JP | 335177 A * | 11/2002 |

OTHER PUBLICATIONS

Cox et al., : "Low Complexity Diversity Combining Algorithm and Circuit Architecture for Co-Channel Interference Cancellation and Frequency-Selective Fading Mitigation," IEEE transaction on Communication vol. 44, No. 9, Sep. 1996, pp 1107-1116.*

* cited by examiner

*Primary Examiner*—Tesfaldet Bocure
(74) *Attorney, Agent, or Firm*—Sughrue Mion Zinn MacPeak & Seas (57) ABSTRACT

A mobile communication system has a plurality of mobile stations and a base station which includes a plurality of antennas, a frequency shift portion, a combining portion, a receiving portion and a signal processing portion. The antenna receives radio waves transmitted by the mobile stations. The frequency shift portion shifts the received signal with a frequency corresponding to each of the antennas. The combining portion determines the shifted signal as a combining signal. The receiving portion converts the combining signal in frequency to make an intermediate frequency signal, and converts the intermediate frequency signal into a digital signal. The signal processing portion includes spreading demodulation means judging means, and fading compensation means.

11 Claims, 8 Drawing Sheets

MOBILE COMMUNICATION SYSTEM HAVING MOBILE STATIONS AND A BASE STATION

BACKGROUND OF THE INVENTION

This invention relates to a mobile communication system having a plurality of mobile stations and a base station, and in particular, to a base station in a code division multiple access (CDMA) system which executes a detecting process of phase difference between receiving signals corresponding to each of a plurality of antennas and a judging process of an arrival direction of the mobile station.

Development has been made about a mobile communication system in a code division multiple access (CDMA) system. A base station has important function as a receiving device which receives a signal from each of a plurality of mobile stations in a service are.

Further, examination has been made about an adaptive array antenna as an antenna device of the base station. In this event, the adaptive array antenna is generally composed of a plurality of omni-directional antenna devices. The omni-directional antenna device operates as a directional antenna by electrically combining receiving signals which are given from the respective antenna devices.

Under such as circumstance, it is required that the phase difference between the receiving signals is accurately detected in the adaptive array antenna. Further, it is necessary that each of the omni-directional antenna device is controlled so as to increase directional gain for an arrival direction of radio waves of the mobile station on the basis of the detected phase difference and decrease the directional gain for interference wave or disturbance wave.

Meanwhile, disclosure has been made about a radar device which realizes high distance resolution as a conventional technique in Japanese Unexamined Patent Publication No. Hei. 6-242229. The radar device has receiving time correcting means and receiving beam directional control means. The receiving time correcting means delays the receiving signals of the respective antenna devices in accordance with time correcting signals.

The receiving beam directional control means generates a time correcting signal so that arrival times of radio waves received by the respective antenna devices are equal to each other at phase coincidence plane with respect to a forming direction of an antenna beam.

Another disclosure has been made about a mobile antenna system in Japanese Unexamined Patent Publication Hei. No. 8-172312. The mobile antenna system commonly uses a local oscillator for combining same phases with a local oscillator of a monopulse circuit.

Deviation of a second intermediate frequency which generates in accordance with the respective antennas is substantially eliminated, and a phase difference signal including a phase detection error generates.

Still another disclosure has been made about a directional control antenna device in a mobile communication which improves utilizing efficiency of a communication slot or a communication channel in Japanese Unexamined Patent Publication No. Hei. 10-70502.

Such a mobile communication system is composed of an array antenna, a frequency converting means, an arrival direction estimating means and an antenna directional control means.

With this structure, the array antenna receives a signal from the base station. The frequency converting means converts a receiving signal into a signal having an intermediate frequency or a base band frequency. The arrival direction estimating means estimates an existing direction of the mobile station based upon the converted signal.

It is necessary that the conventional adaptive array antenna has a receiving portion and a signal processing portion in accordance with the respective omni-directional antenna devices. Therefore, a scale of the mobile station device becomes large, and the cost also becomes high.

To this end, it is desired that the receiving portion and the signal processing portion corresponding to the respective omni-directional antenna devices are reduced in size and cost.

Further, the conventional double super heterodyne system has been adopted in the receiving portion corresponding to each of the omni-directional antenna devices.

Accordingly, an oscillator for frequency reverse conversion (down-convert) becomes necessary in the receiving portion. The oscillator generates a signal which is locally oscillated. A phase error due to phase noise readily generates between signals which are locally oscillated in accordance with each of a plurality of antennas. In consequence, it is difficult to accurately detect the phase difference between the receiving signals corresponding to the respective omni-directional antenna devices.

Therefore, the base station, which accurately detects the phase difference between the receiving signals corresponding to the respective omni-directional antenna devices and accurately judges the arrival direction of each of the radio waves of the mobile stations, has been desirable.

SUMMARY OF THE INVENTION

It is therefore an object of this invention to provide a base station which is capable of reducing in size and cost by integrating receiving signals corresponding to each of a plurality of omni-directional antenna devices into a single signal line in an adaptive array antenna.

It is another object of this invention to provide a base station which is capable of accurately judging an arrival direction of each of radio waves of a plurality of mobile stations by accurately detecting phase difference between receiving signals corresponding to each of a plurality of antenna devices in an adaptive array antenna.

According to this invention, a mobile communication system has a plurality of mobile stations and a base station which includes a plurality of antennas, a frequency shift portion, a combining portion, a receiving portion and a signal processing portion.

With such a structure, the antenna receives radio waves transmitted by the mobile stations. The frequency shift portion shifts the received signal with a frequency corresponding to each of the antennas. The combining portion determines the signal, which is shifted in frequency, as a combining signal. The receiving portion converts the combining signal in frequency to make an intermediate frequency signal, and converts the intermediate frequency signal into a digital signal.

Further, the signal processing portion comprises spreading demodulation means, judging means, and fading compensation means.

In this event, the spreading demodulation means demodulates the digital signal with spreading by the use of a spreading code that is compensated frequency shift component corresponding to each of the antennas, and makes a demodulation signal at every antenna.

The judging means specifies an arrival direction of each of the radio waves of the mobile stations on the basis of the demodulation signal, and produces the demodulation signal for each of the mobile stations.

The fading compensation means performs a RAKE combination from the demodulation signal for each of the mobile stations.

Herein, it is to be noted that the mobile communication system utilizes a code division multiple access.

More specifically, the frequency shift portion includes a plurality of amplifiers corresponding to the antennas, a plurality of mixers, and a plurality of oscillators.

With this structure, the amplifier amplifies a signal received at every antenna. The oscillator oscillates a frequency predetermined on the basis of a value corresponding to each of the antennas. Further, the mixer frequency-shifts the amplified signal with the oscillating signal.

Alternatively, the frequency shift portion includes a plurality of amplifiers corresponding to the antennas, a plurality of mixers, a plurality of frequency multipliers, and a single reference oscillator.

With such as structure, the amplifier amplifies a signal received at every antenna. The reference oscillator oscillates a single predetermined frequency. The frequency multiplier multiplies a reference oscillating signal with a predetermined value based upon a value corresponding to each of the antennas. Further, the mixer frequency-shifts the amplified signal with a multiplied signal.

Thus, the base station in the code division multiple access system according to this invention has the frequency shift portion in accordance with each of a plurality of antenna devices, and thereby, can be constituted by a single receiving portion. In consequence, the base station device can be reduced in size and cost.

Further, the phase difference between the receiving signals corresponding to each of a plurality of omni-directional antennas can be accurately detected. Consequently, the arrival direction of each of the radio waves of the mobile stations can be accurately identified.

DESCRIPTION OF PREFERRED EMBODIMENTS

First Embodiment

Figure 1:
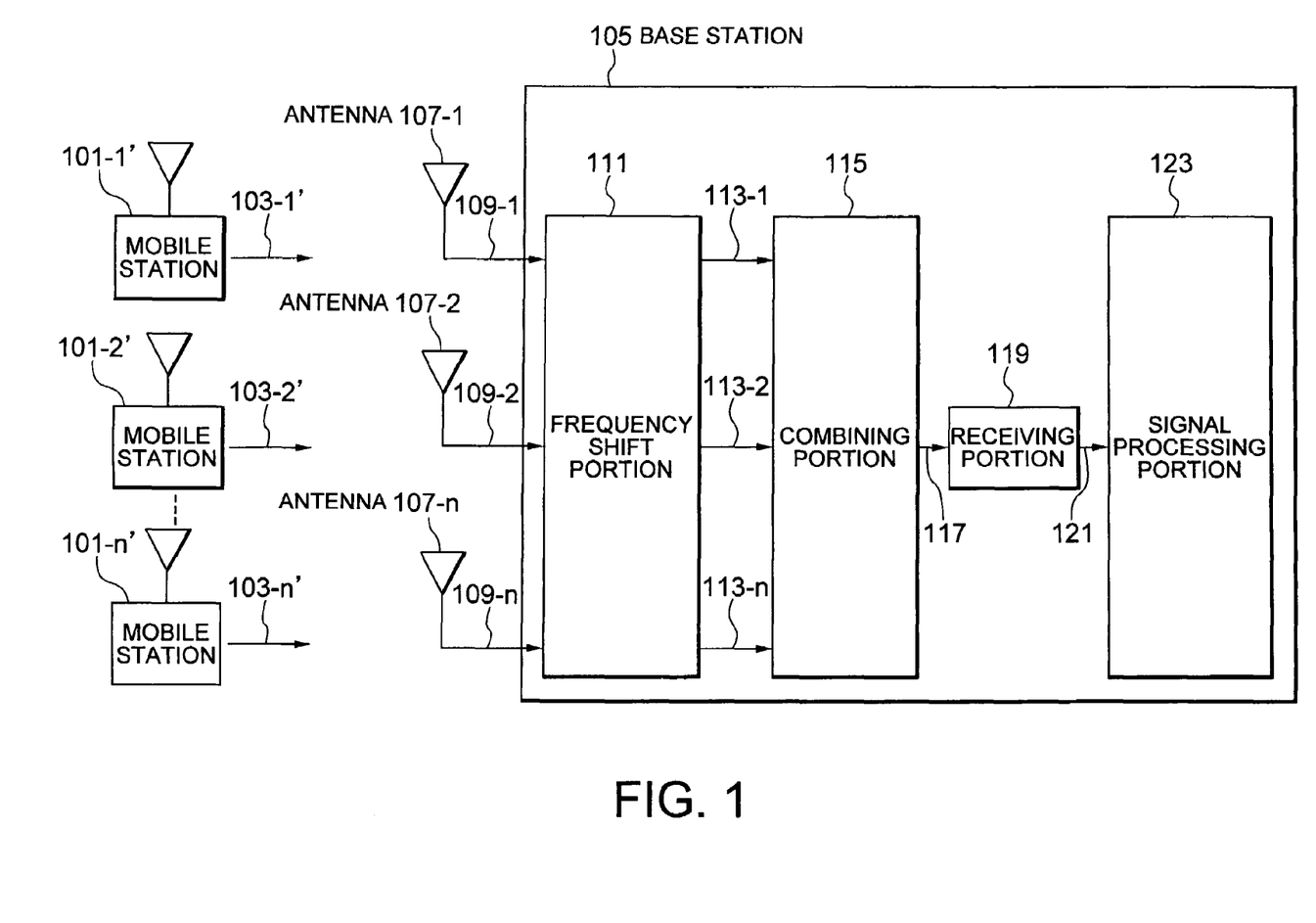
FIG. 1 is a block structure diagram for explaining an idea of a code division multiple access system which contains a base station according to this invention.

Referring to FIG. 1, description will be made about a first embodiment of this invention. In FIG. 1, a mobile communication system including a base station 105 due to a code division multiple access (CDMA) system is illustrated.

The mobile communication system due to the CDMA system is composed of a plurality of mobile stations (101-1'~n') and a base station 105. Each of the mobile stations (101-1'~n') performs spreading modulation due to an inherent spreading code for a data signal to be transmitted (a modulation data signal) to make a transmission signal.

The base station 105 has an adaptive array antenna as receiving means of the transmitted signals (103-1'~n'). The adaptive array antenna is composed of a plurality of antennas (a plurality of antenna devices) 107~n. Each of the antennas 107~n is an omni-directional antenna. The respective antennas are arranged with a space of $\lambda/4$ ($\lambda$: wavelength of an used frequency) or more.

Herein, it is to be noted that the number n of the mobile stations 101 and the number n' of the antennas 103 are not always equal in FIG. 1, and the relationship between n and n' may not be restricted in this invention. This fact will be described later in detail description of a signal processing portion 123.

The base station 105 is composed of the adaptive array antenna 107, a frequency shift portion 111, a combining portion 115, a receiving portion 119 and a signal processing portion 123.

The adaptive array antenna has a plurality of antennas 107-1~n which receive the transmitting signals 103-1'~n' which are performed the spreading modulation corresponding to each of the mobile stations 101'~n'. The antennas 107-n receive the transmitting signals 103-1'~n' corresponding to each of the mobile stations 101-1'~n'.

The frequency shift portion 111 performs frequency shift for the receiving signals 109-1~n in accordance with each of the antennas 107-1~n. The frequency shift process is executed in accordance with each of the antennas 107-1~n. A center frequency of the receiving signal 109-1~n is converted with integral number times (1 to the total number n of the antenna devices) of reference frequency (f0).

Figure 2:
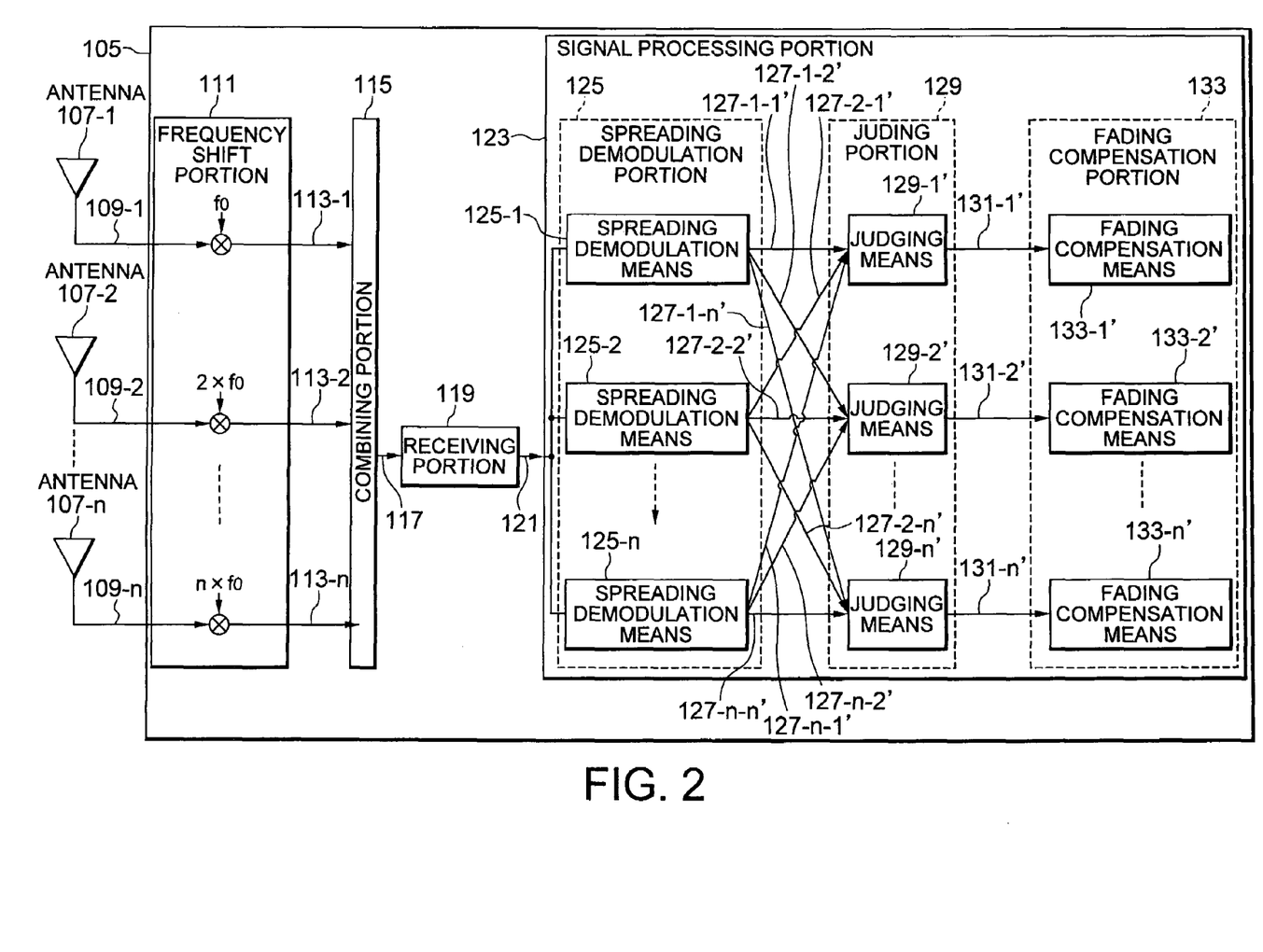
FIG. 2 is a block structure diagram for explaining a detail structure of a base station in a code division multiple access system according to a first embodiment of this invention.

Referring to FIG. 2, the center frequency of the receiving signals 109-n corresponding to the antennas 107-n is mixed and shifted with a signal which gives a frequency "n×f0".

The combining portion 115 combines the receiving signals 113-1~n shifted in frequency to generate a combining signal 117. Herein, it is to be noted that hybrid of Wilikinson due to microstrip line is adopted in the combining portion 115 in this embodiment.

The receiving portion 119 performs frequency reverse conversion for the combining signal 117, and generates a combining signal (157, referring to FIG. 5) which is reversely converted in frequency. In this event, the combining signal, which is reversely converted in frequency, is an analog signal. Further, the receiving portion 119 converts the combining signal, which is reversely converted in frequency, into a digital signal.

The signal processing portion 123 performs a spreading demodulation process for the digital signal 121 in accordance with each of the antennas 107-1'~n. The spreading demodulation process is executed on the basis of the spreading code inherent to each of the mobile stations 101-1~n and a shift frequency difference in the frequency shift.

Further, the signal processing portion 123 judges an arrival direction of radio waves of the respective mobile stations 101-1'~n' based upon the spreading demodulation process.

Figure 4:
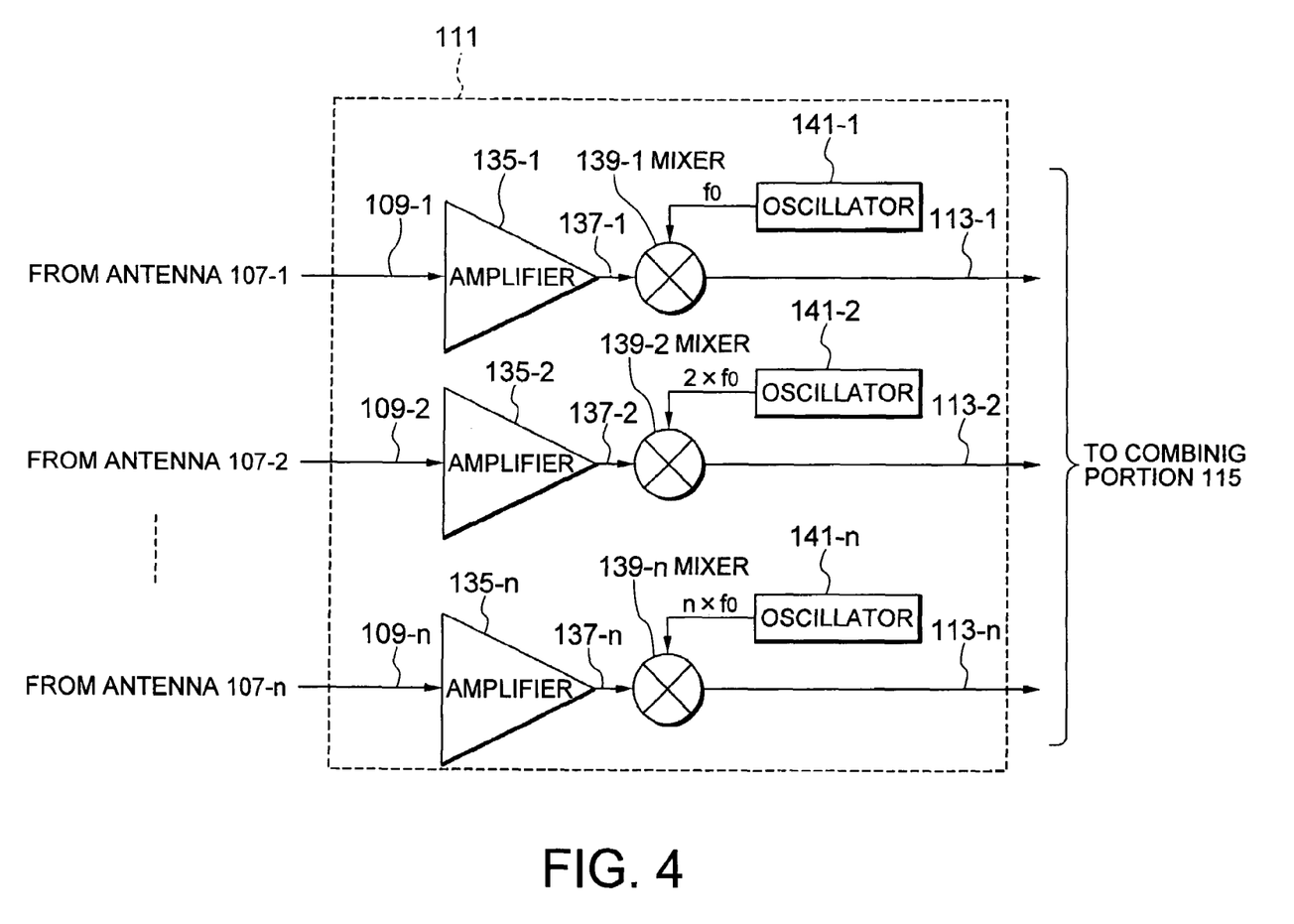
FIG. 4 is a block structure diagram for explaining a detail structure of a frequency shift portion in a base station according to a first embodiment of this invention.

In FIG. 4, the frequency shift portion 111 has frequency shift means corresponding to each of the antennas 107-1'~n. The frequency shift means corresponding to the antenna 107-n is composed of an amplifier (amplifying means) 135-n, an oscillator (oscillating means) 141-n, and a mixer (mixing means) 139-n.

With such a structure, the amplifier 135-n amplifies the receiving signal 109-n. The receiving signal 109-n received by the antenna 101-n is amplified by the amplifier 135-n having low NF characteristic to prevent deterioration of the NF characteristic due to the mixer 139-n described later.

The oscillator 141-n generates a signal which is locally oscillated. The locally oscillated signal has a frequency (n×f0) corresponding to the antenna 107-n.

The mixer 139-n shifts a frequency for the amplified receiving signal 137-n on the basis of the frequency (n×f0). The mixer 139-n produces the receiving signal 113-n which is shifted in frequency. The receiving signal 113-n shifted in frequency is given to the combining portion 115.

The mixer 139-n is composed of a double balanced mixer or a transistor in this embodiment while the oscillator 141-n is composed of a PLL (Phase Locked Loop) circuit. The PLL circuit produces a locally oscillated signal having an arbitrary oscillating frequency.

Figure 5:
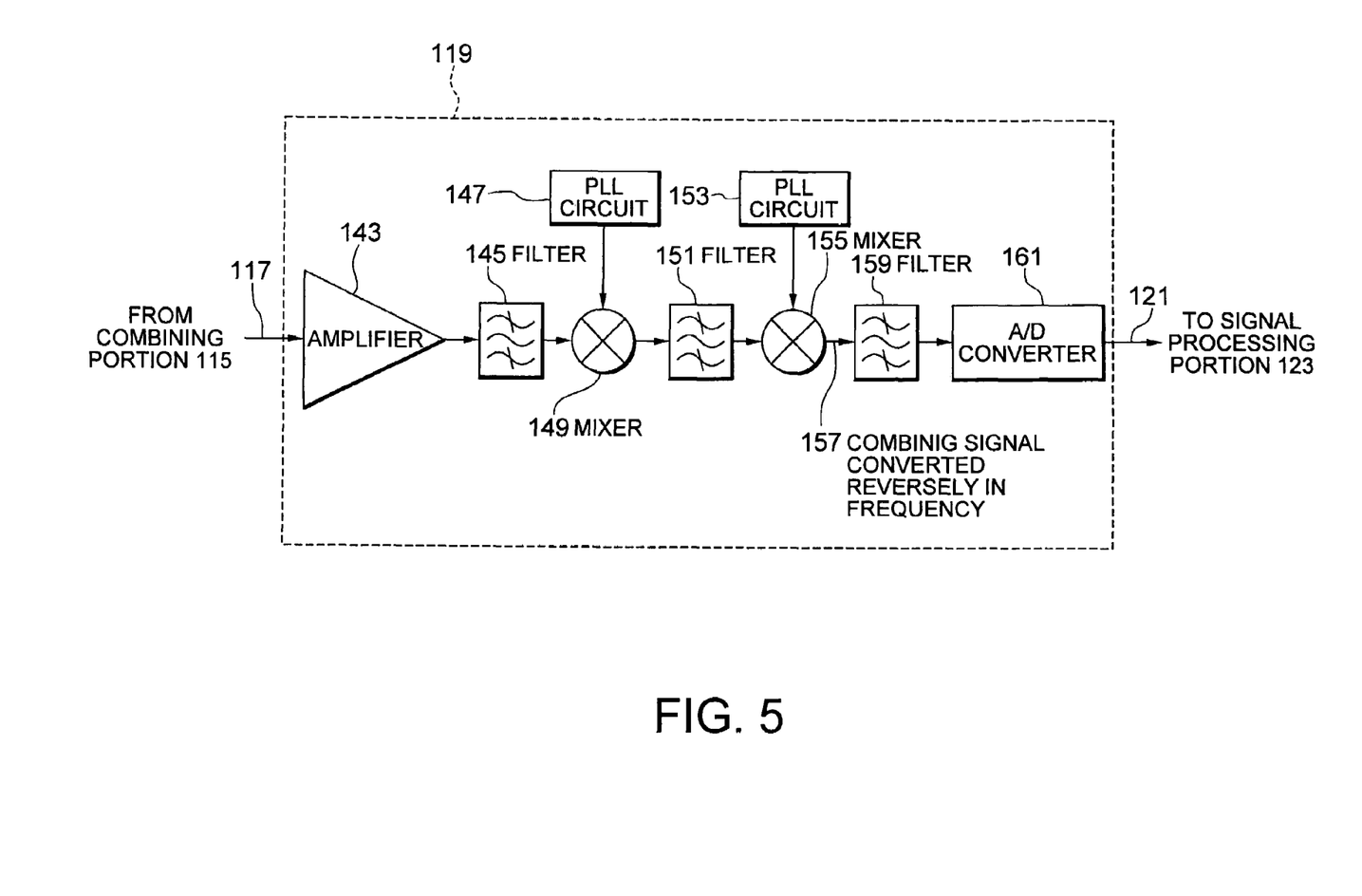
FIG. 5 is a block structure diagram for explaining a detail structure of a receiving portion in a base station according to a first embodiment of this invention.

In FIG. 5, a detail structure of the receiving portion 119 is illustrated. The receiving portion 119 is structured by the double super heterodyne system in this embodiment, and is composed of an amplifier 143, filters (145, 151, and 159), PLL circuits (147 and 153), mixers (149 and 155) and an analog/digital converter (A/D converter) 161.

With such a structure, the amplifier 143 carries out an amplifying process for the combining signal 117 from the combining portion 115, and produces an amplified combining signal (not shown). The amplifier 143 has low NF characteristic. Each of the filters (145, 151 and 159) removes frequency components except for receiving frequency band of the inputted signal on the basis of predetermined frequency characteristic.

In particular, the filters (151 and 159) remove unnecessary radiation due to the frequency reverse conversion (down-convert).

The filter 145 performs a filtering process for the amplified combining signal, and produces a first filtering signal (not shown). The mixer 149 performs a (first) frequency reverse process for the first filtering signal on the basis of a signal generated from the PLL circuit 147.

Further, the filter 151 performs the filtering process for the first filtering signal (not shown) which is reversely converted in frequency, and produces a second filtering signal. The mixer 155 performs a (second) frequency reverse process for the second filtering signal on the basis of a signal generated from the PLL circuit 153.

The second filtering signal (the combining signal 157 which is reversely converted), which is reversely and finally converted in frequency in accordance with the double super heterodyne system, is produced. The combining signal 157, which is reversely converted in frequency, is converted and produced into a digital signal 121 by the A/D converter 161.

A Voltage Control Oscillator (VCO) is adopted for each of the PLL circuits (147, 153) in this embodiment. Each of the mixers (149 and 155) is structured by the double balanced mixer or the transistor to execute the frequency reverse conversion process.

Subsequently, description will be made with reference to FIG. 2.

The signal processing portion includes a spreading demodulation portion 125, a judging portion 129, and a fading compensation portion (or a fading measuring portion) 133. The spreading demodulation portion 125 has spreading demodulation means (125-1~n) corresponding to each of a plurality of antennas (107-1~n). The judging portion 129 has judging means 129-1'~n' corresponding to each of a plurality of mobile stations 101-1'~n'. The fading compensation portion 133 has fading compensation means 133-1'~n' corresponding to each of a plurality of mobile stations 101-1'~n'.

The spreading demodulation means 125-n performs the spreading demodulation process for the digital signal 121 on the basis of a spreading code (not shown) corresponding to each of the mobile stations 101-1'~n' and difference (−(n−1)×f0)) with respect to a reference frequency (f0) in the frequency conversion (frequency (n×f0)).

Further, the spreading demodulation means 125-n produces modulated data signals (127-n-1', 127-n-2', . . . ,127-n-n') at every mobile stations 101-1'~n'. In this time, history data, which indicates that the process due to the spreading demodulation means 125-n is performed, is attached to each of the modulated data signals. In this case, detail description will be later made about the spreading demodulation process.

The judging means 129-n' is given with the modulated data signal (127-1-n', 127-2-n', . . . 127-n-n') corresponding to the predetermined mobile station (in this case, the mobile station 101-n'), and executes a delay time judging process for identifying the arrival direction of radio waves of the mobile station (101-n').

The fading compensation means 133-n' is given with a demodulated data group 131-n' at every mobile stations. The demodulated data group 131-n' at every mobile stations is formed from the demodulated data signals (127-1-n', 127-2-n', . . . , 127-n-n') corresponding to the predetermined mobile station (in this case, the mobile station 101-n').

The fading compensation means 133-n' performs a RAKE combining process for the demodulated data group 131-n' at every mobile station.

In this event, the spreading demodulation portion 125, the judging portion 129, and the fading compensation portion 133 are logical components, and does not constitute an actual hardware. Therefore, they are realized by a change of processing sequence or a unified structure.

Subsequently, description will be made about an operation of the base station in the CDMA system according to this embodiment with reference to FIG. 2.

Each of a plurality of mobile stations 101-1'n' produces each of the transmitted signals 103-1'~n' spread in spectrum. The transmitted signals 103-1'~n' are received by the antennas 107-1~n.

Each of the mobile stations 101-1'~n' has N1', N2', . . . , Nn' as transmitted data series. Each of the transmitted data series is performed with the spreading modulation by each spreading code X1', X2', . . . , Xn' inherent to the mobile station, and is produced as the transmitted signals 103-1'~n' having a radio frequency f.

In the transmitted signals (103-1'~n'), the transmitted signal 103-1' is defined as f (1') (=N1'*X1'+f), the transmitted signal 103-2' is defined as f (2') (=N2'*X2'+f), and further, the transmitted signal 103-n' is defined as f (n') (=Nn'*Xn'+f.

Herein, it is to be noted that "*Xn'" represents a logic expression which indicates the spreading process. Further, "+f " represents a logic expression which indicates the frequency conversion. The transmitted signals f (1')~f (n') based upon the above-mentioned definition are received by the antennas 107-1~n.

Figure 3:
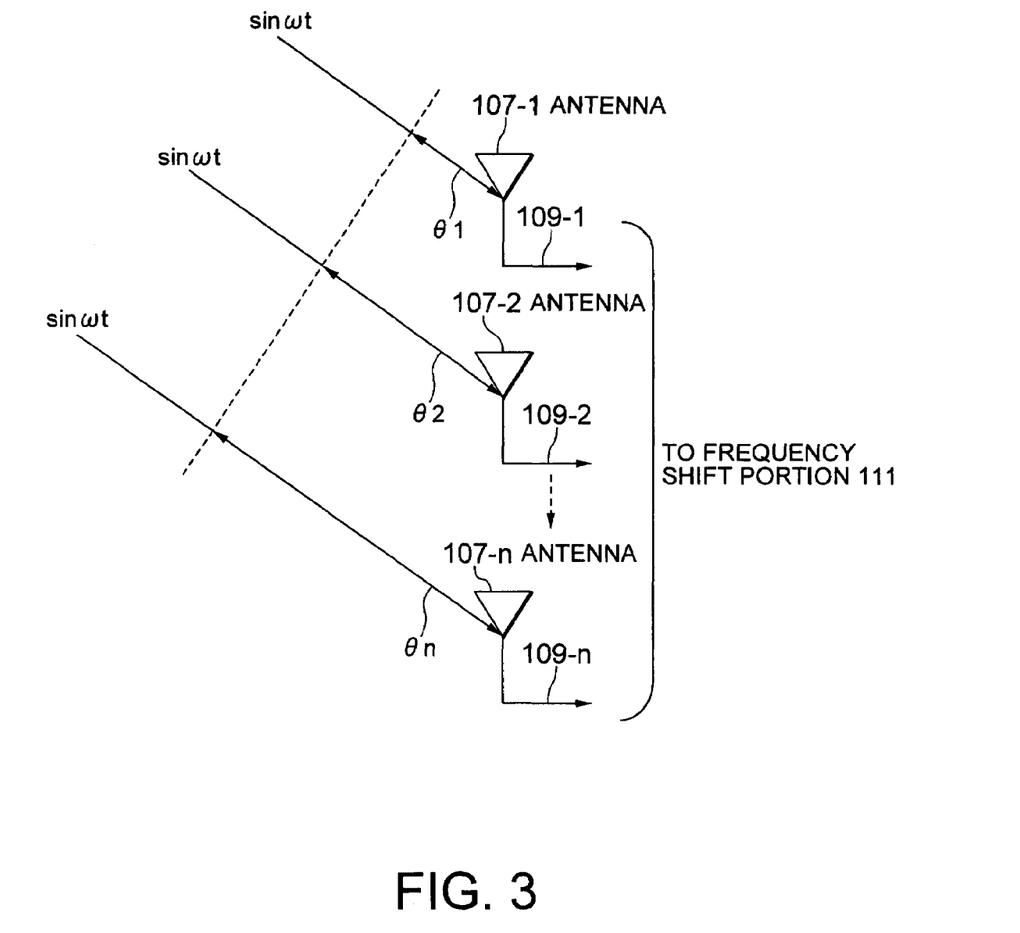
FIG. 3 is a block structure diagram for explaining a part of operation of a base station in a code division multiple access system according to a first embodiment of this invention.

In FIG. 3, a transmitted signal (sin (ωt)) from a mobile station is received by each of a plurality of antennas 107-1~n as an example. Herein, it is to be noted that each of the antennas 107-1~n has physical positions different from to each other.

When the transmitted signal (sin(ωt)) is received, phase difference occurs in accordance with an incident angle (θ1~θn) for the antenna. Therefore, the phase difference between the receiving signals takes place because the phases of the receiving signals are different to each other in accordance with the receiving antennas.

For example, the transmitted signal received by the antenna 107-1 becomes sin (ωt+θ1) in comparison with the arrival wave. The transmitted signal received by the antenna 107-n becomes sin (ωt+θn).

The receiving signals 109-1~n are combined by the combining portion 115 (referring to FIGS. 1 and 2), the signals having different phases are combined. In this case, the signal processing portion 123 can not judge the phase difference between the antenna, which has received the transmitted signal during the spreading demodulation, and the arrival wave.

Further, the signal processing portion 123 can not decide directivity of the antenna, and it is difficult to properly control the adaptive array antenna. Therefore, the frequency shift process according to this invention is executed.

Referring to FIG. 2, the receiving signal 109-1 corresponding to the antenna 107-1 is shifted in frequency on the basis of the locally oscillated signal (frequency fo). Each transmitted signal, which forms the receiving signal 109-1, is shifted in frequency by the use of the frequency shift portion 111 in the following manner.

Component of the transmitted signal f (1') is shifted in frequency, and becomes signal component f1 (1') (=f(1')+fo). The component of the transmitted signal 103-2' is shifted in frequency, and becomes signal component f1 (2') (=f (2')+fo). Further, the component of the transmitted signal 103-n' is shifted in frequency, and becomes signal component f1 (n') (=f (n')+fo).

The receiving signal 109-2 corresponding to the antenna 107-2 is shifted in frequency on the basis of the locally oscillated signal (frequency 2×fo). Each transmitted signal, which forms the receiving signal 109-2, is shifted in frequency by the use of the frequency shift portion 111 in the following manner.

Component of the transmitted signal f (1') is shifted in frequency, and becomes signal component f 2 (1') (=f (1')+2×fo). The component of the transmitted signal 103-2' is shifted in frequency, and becomes signal component f1 (2') (=f (2')+2×fo). Further, the component of the transmitted signal 103-n' is shifted in frequency, and becomes signal component f2 (n') (=f (n')+2×fo).

Further, the receiving signal 109-n corresponding to the antenna 107-n is shifted in frequency on the basis of the locally oscillated signal (frequency n×fo). Each transmitted signal, which forms the receiving signal 109-n, is shifted in frequency by the use of the frequency shift portion 111 in the following manner.

Component of the transmitted signal f (1') is shifted in frequency, and becomes signal component f n(1') (=f (1')+n×fo). The component of the transmitted signal f (2') is shifted in frequency, and becomes signal component f n (2') (=f (2')+n×fo). Further, the component of the transmitted signal f (n') is shifted in frequency, and becomes signal component f n (n') (=f (n')+n×fo).

Therefore, the center frequency of the receiving signal is shifted in frequency with (fo×integral number times (1 to the total number of the antennas)) in accordance with each of a plurality of antennas (107-1'~n). The shifted receiving signal 113-1~n are given to the combining portion 115, and is produced as the combining signal 117.

The combining portion 115 inputs and combines the signal component shifted in frequency. The combining signal is represented by the following equation.

$$fSUM=\{(f1(1')+f1(2')+\ldots+f1(n'))+(f2(1')+f2(2')+\ldots+f2(n'))+\ldots+(fn(1')+fn(2')+\ldots+fn(n'))\}$$ [Equation 1]

Figure 6A:
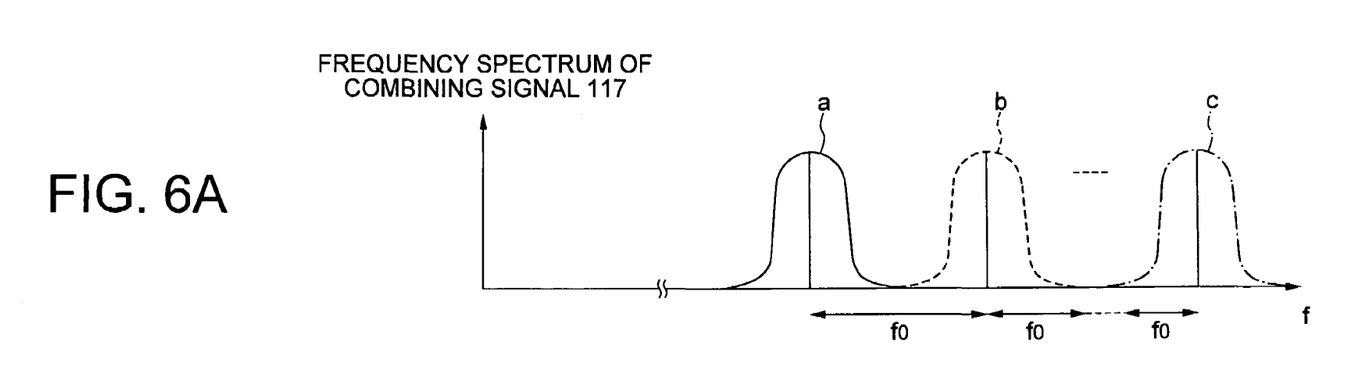
FIGS. 6A and 6B are frequency spectrum diagrams for explaining a part of operation of a base station in a code division multiple access system according to a first embodiment of this invention.

In FIG. 6A, frequency spectrum of the combining signal 117 is illustrated. The frequency spectrum of the combining signal 117 is formed by the frequency spectrum of the receiving signals (109-1~n) corresponding to each of a plurality of antennas (107-1-n).

The spectrum a corresponds to the receiving signal 109-1 in accordance with the antenna 107-1. The spectrum b corresponds to the receiving signal 109-2 in accordance with the antenna 107-2. Further, the spectrum c corresponds to the receiving signal 109-n in accordance with the antenna 107-n.

In FIG. 6A, the frequency spectrums (a, b, . . . c) of the receiving signals (109-1, 2, . . . ,n) substantially and continuously distributes on a frequency axis without overlapping to each other on the basis of a reference frequency (f0).

In this case, it is required that the phase error between the signals, which are locally oscillated by the oscillators 141-1-1~n, is as small as possible. The phase error is preferably 3° or less during a single frame in the receiving signal. This is based upon such a fact that accurate phase difference detection can be prevented in the space of the receiving signal when the phase error due to the phase noise occurs for the locally oscillated signal corresponding to each of a plurality of antennas (107-1~n).

Subsequently, the process of the receiving portion 119 is executed. The combining signal 117 given to the receiving portion 119 is amplified by the amplifier 143. The filter 145 inputs the amplified combining signal, and produces the first filtering signal which is filtered only signal component in the receiving frequency band.

The mixer 149 converts the first filtering signal in the radio frequency band into the signal of the intermediate frequency based upon the signal which is locally shifted by the PLL circuit 147. The filter 151 inputs the intermediate frequency signal, removes unnecessary signal components, and produces the second filtering signal.

The mixer 155 down-converts the second filtering signal into a frequency band, which is convertible as the digital signal, on the basis of the signal which is locally oscillated by the PLL circuit 153, and produces the combining signal 157 which is reversely converted in frequency.

The receiving portion 119 inputs the combining signal 117 defined in the equation 1. The receiving portion 119 converts the combining signal 117 into the intermediate frequency which is capable of performing the base band process. In this event, the combining signal 157 (FSUM), which is reversely converted in frequency, is represented by the following equation in accordance with the equation 1.

$$FSUM=\{(F1(1')+F1(2')+\ldots+F1(n'))+(F2(1')+F2(2')+\ldots+F2(n'))+\ldots+(Fn(1')+Fn(2')+\ldots+Fn(n'))\}$$ [Equation 2]

In this case, function F in the [equation 2] is obtained by performing the frequency reverse conversion for function f in [equation 1].

Figure 6B:
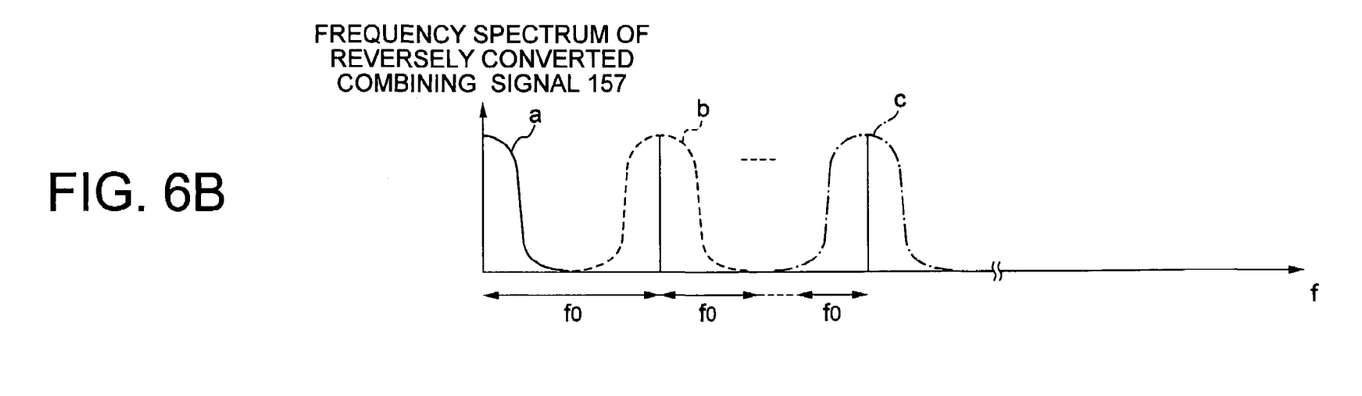

In FIG. 6B, frequency spectrum of the combining signal 157 is illustrated.

In FIG. 6B, the frequency spectrums (a, b, ... c) of the receiving signals (109-1, 2, ... ,n) substantially and continuously distributes on the frequency axis without overlapping to each other based upon the reference frequency (f0).

The filter 159 removes unnecessary components of the combining signal 157, which is reversely converted in frequency, on the basis of a sampling frequency in the A/D converter 161. The A/D converter 161 produces the digital signal 121. In such a digital signal 121, the phase difference between the receiving signals (109-1'~n) is substantially retained.

The signal processing portion 123 inputs the digital signal 121. The inputted digital signal 121 is distributed to each spreading demodulation means (125-1'~n) to perform the spreading demodulation process.

The spreading demodulation means 125-1 multiplies the spreading code corresponding to data series to be demodulated with spreading for the receiving signal (digital signal 121). In this event, it is required that the frequency of the spreading code is same as the frequency of the data series to be demodulated with spreading.

The spreading code corresponding to the mobile station 101-1' is "X1'". The spreading code corresponding to the mobile station 101-2' is "X2' ". Further, the spreading code corresponding to the mobile station 101-n' is "Xn'".

The receiving signal 109-2 corresponding to the antenna 107-2 is performed frequency shift with "fo " on the basis of the antenna 107-1. Therefore, the spreading demodulation is carried out for the digital signal 121 by the use of the spreading code multiplied with "–fo" for each spreading code.

The spreading code set in the spreading demodulation means 125-2 corresponding to the antenna 107-2 is as follows. The spreading code corresponding to the mobile station 101-1' becomes X1'*(-fo). The spreading code corresponding to the mobile station 101-2' becomes X2'*(-fo). Further, the spreading code corresponding to the mobile station 101-n' becomes Xn'*(-fo).

In this case, "-fo" indicates logic expression which represents shift in a reverse side against shift due to the frequency conversion portion. Herein, it is to be noted that "*(-fo)" indicates the logic expression which represents the multiplication.

In the same manner, the spreading code set in the spreading demodulation means 125-n corresponding to the antenna 107-n is as follows. The spreading code corresponding to the mobile station 101-1' becomes X1'*{-(n–1)fo}. The spreading code corresponding to the mobile station 101-2' becomes X2'*{-(n–1)-fo}. Further, the spreading code corresponding to the mobile station 101-n' becomes Xn'*{-(n–1) (-fo)}.

The spreading of the receiving signal is released by the spreading demodulation process based upon the spreading code, and only data series to be restored is demodulated. The frequency shift component due to the frequency shift portion 111 is also compensated. In this event, history data of the spreading demodulation means, which is performed with the spreading demodulation process, is attached to the demodulation data series (demodulation data).

In general, when the transmitted data series N1' is N1'={α, β, γ, ... }, the demodulation data series N1" which is demodulated with spreading by the spreading demodulation means 125-n, becomes N1"={n, α, β, γ ... }.

Each spreading demodulation means 125-1~n attaches data, which gives the history of the spreading demodulation process, into the demodulation data series. In consequence, the spreading demodulation means can be identified from the demodulation data series. Further, the antenna corresponding to the demodulation data series can be specified.

The demodulation data (127-1-1'~n', 127-2-1'~n', ..., 127-n-1'~n') generated in the spreading demodulation means 125-1~n is given to the judging portion 129. Each judging means 129-1'~n' inputs the modulation data series corresponding to each of a plurality of mobile stations 101-1'~n', and executes the delay time judging process.

The judging means 129-1' inputs the demodulation data series (127-1-1', 127-2-1', ..., 127-n-1') corresponding to the mobile station 101-1'. The judging means 129-2' inputs the demodulation data series (127-1-2', 127-2-2', ..., 127-n-2') corresponding to the mobile station 101-2'. Further, the judging means 129-n' inputs the demodulation data series (127-1-n', 127-2-n', ..., 127-n-n') corresponding to the mobile station 101-n'.

Figure 7A:
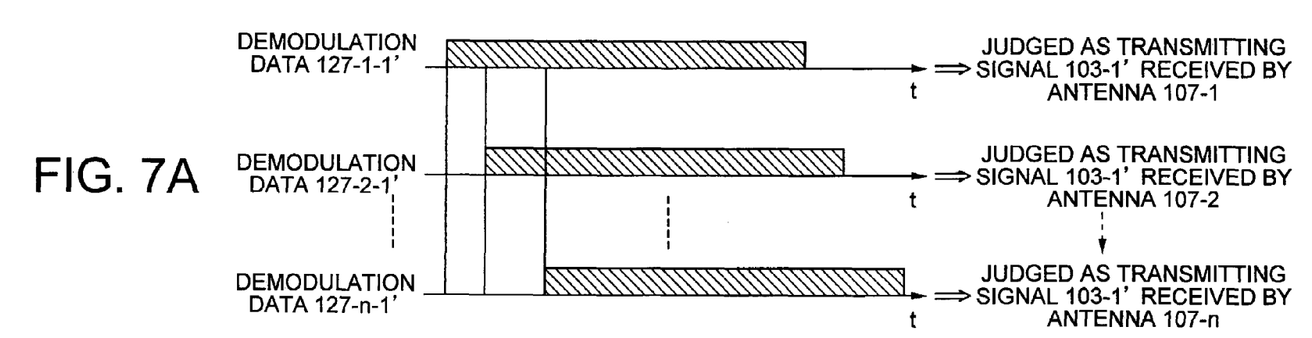
FIGS. 7A and 7B are timing judging diagrams for explaining a part of operation of a base station in a code division multiple access system according to a first embodiment of this invention.

In FIG. 7A, delay time judging diagram in the judging means 129-1' is illustrated. Each of the demodulation series (127-1-1', 127-2-1', ..., 127-n-1') is arranged on the same time axis, and is compared.

As a result, the delay time of the modulation data series 127-1-1' generated by the diffusion demodulation means 125-1 is smallest. Therefore, the demodulation date series 127-1-1' is the transmitted signal 103-1' received by the antenna 107-1. Further, the mobile station 101-1' judges arriving from the direction of the antenna 101-1.

Figure 7B:
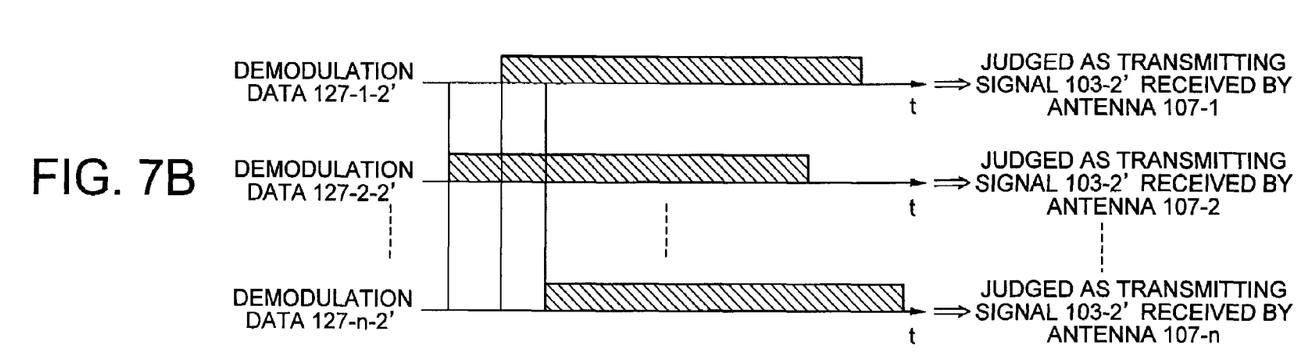

In FIG. 7B, delay time judging diagram in the judging means 129-2' is illustrated. Each of the demodulation series (127-2-2', 127-2-2' ... , 127-n-2') is arranged on the same time axis, and is compared.

As a result, the delay time of the modulation data series 127-1-2' generated by the spreading demodulation means 125-2 is smallest. Therefore, the demodulation data series 127-2-2' is the transmitted signal 103-2' received by the antenna 107-2. Further, the mobile station 101-2' judges arriving from the direction of the antenna 101-2.

The demodulation data series given to each judging means 129-1'~n' is sent to the fading compensation portion 133 as the demodulation data group 131-1'~n' at every mobile stations. Each fading compensation means 133-1'~n' executes the RAKE combining process as the compensation (measuring) technique of the multi-pass fading.

The demodulation data series (127-1-1', 127-2-1' ..., 127-n-1) forms a demodulation data group 131-1'. The fading compensation means 133-1' inputs the demodulation data group 131-1', and executes the RAKE process corresponding to the mobile station 101-1'.

The demodulation data series (127-1-n', 127-2-n', ..., 127-n-n') forms a demodulation data group 131-n'. The fading compensation means 133-n' inputs the demodulation data group 131-n', and executes the RAKE process corresponding to the mobile station 101-n'.

In this embodiment, the judging means 129-1'~n' and the fading compensation means 133-1'~n' are required with the number of a plurality of mobile stations 101-1'~n'. Further, the number of a plurality of mobile stations 101-1'~n' is determined as an upper limit thereof on the basis of specification of the service area assigned the base station 105.

The base station according to this embodiment includes the frequency shift portion which performs frequency shift corresponding to each antenna for the receiving signal, the combining portion 115 which combines each of the receiving signals shifted in frequency, the receiving portion 119 which is commonly provided for the combining signal, and the signal processing portion 123 which can perform the signal process on the condition that the phase difference is substantially retained.

Consequently, the base station device can be reduced in size and cost. Further, the arrival directions of the radio waves of a plurality of mobile stations can be accurately identified in the service area.

Second Embodiment

Subsequently, description will be made about a base station according to a second embodiment. The base station according to this embodiment is different from the frequency shift portion 111 according to the above-mentioned first embodiment in structure.

Figure 8:
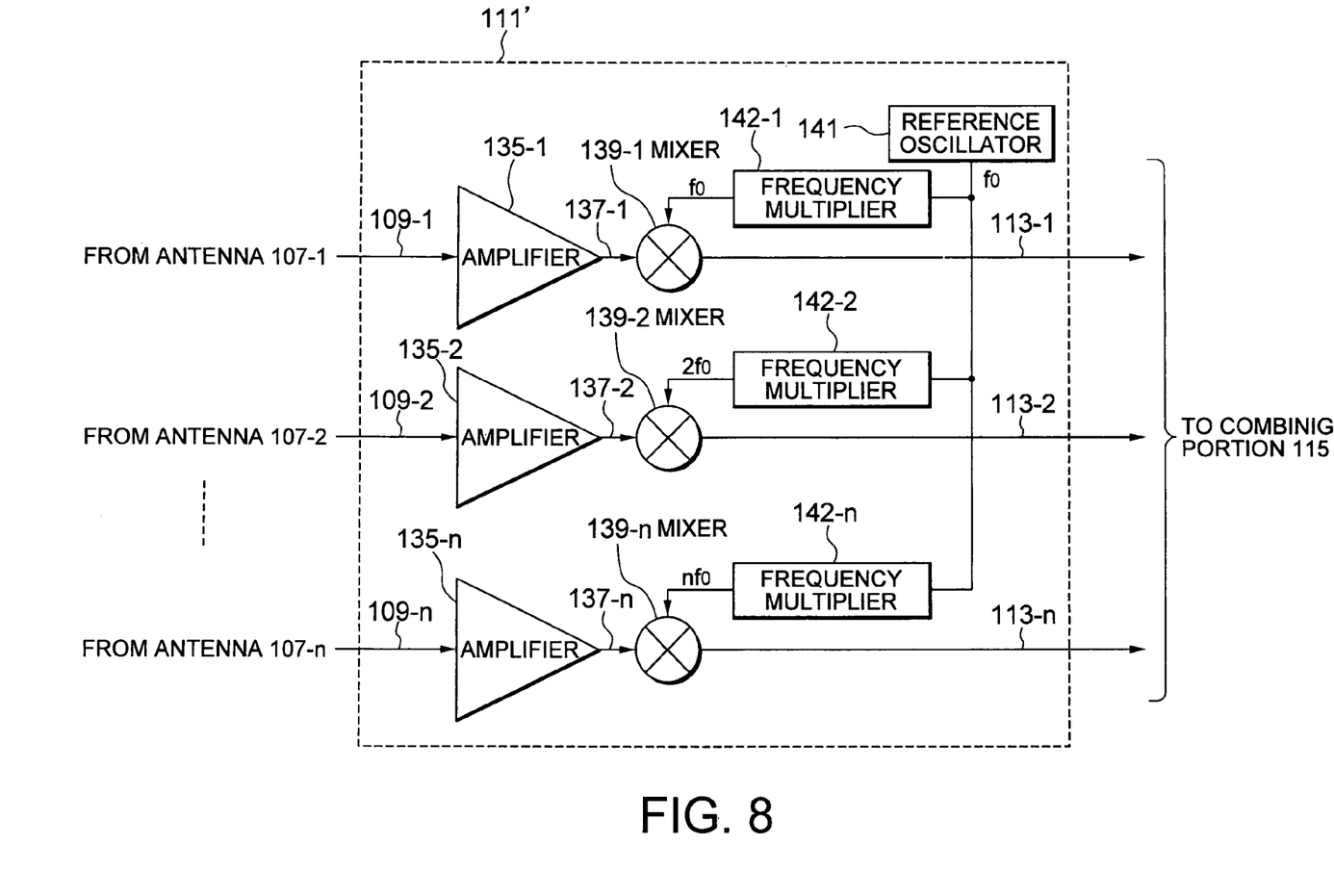
FIG. 8 is a block structure diagram for explaining a detail structure of a frequency shift portion in a base station according to a second embodiment of this invention.

In FIG. 8, a detail structure of the frequency shift portion 11' is illustrated. Herein, it is to be noted that the same reference numbers are attached for the same components and signals as the first embodiment, and description thereof is omitted.

The frequency shift portion 111' according to this embodiment has a reference oscillator 141 which is common for a plurality of antennas. The frequency shift portion 111' includes frequency shift means corresponding to each of a plurality of antennas 107-1'~n and the reference oscillator 141 (oscillating means) for generating a signal which gives a reference frequency (f0).

The frequency shift means corresponding to the antenna 107-n is composed of an amplifier (amplifying means) 135-n, a mixer (mixing means) 139, and a frequency multiplier (multiplying means) 142-n. In this embodiment, the frequency multiplier 142 is preferably structured by a varactor diode.

The amplifier 135-n amplifies the receiving signal 109-n. The frequency multiplier 142-n multiplies the reference frequency (f0) of the signal, which is locally oscillated, on the basis of "n" predetermined in accordance with each of a plurality of antenna devices. The mixer 139-n shifts a frequency on the basis of the reference frequency (n×f0) which is multiplied the amplified receiving signal 137-n.

A single common reference oscillator 141 is provided in this embodiment. Therefore, the phase between the receiving signals corresponding to each of a plurality of antennas 107~n is substantially invariable before and after the frequency shift process. Thereby, the phase difference between the receiving signals can be accurately transmitted into the signal processing portion 123.

What is claimed is:

1. A mobile communication system comprising a plurality of mobile stations and a base station, said base station comprising a plurality of antennas, a frequency shift portion, a combining portion, a receiving portion and a signal processing portion, wherein:

each antenna receives radio waves transmitted by the mobile stations;

the frequency shift portion shifts the received signals with a frequency corresponding to each of the antennas;

the combining portion combines the signal, which is shifted in frequency, as a combining signal;

the receiving portion converts the combining signal in frequency to make an intermediate frequency signal, and converts the intermediate frequency signal into a digital signal; and the signal processing portion comprises:

spreading demodulation means which demodulates the digital signal with spreading by the use of a spreading code that is compensated frequency shift component corresponding to each of the antennas and which makes a demodulation signal at every antenna;

judging means which specifies an arrival direction of each of the radio waves of the mobile stations on the basis of the demodulation signal and which produces the demodulation signal for each of the mobile stations; and fading compensation means which performs a RAKE combination from the demodulation signal for each of the mobile stations, wherein:

the frequency shift portion comprises a plurality of amplifiers corresponding to the antennas, a plurality of mixers, and a plurality of oscillators;

each amplifier amplifies a signal received at every antenna;

each oscillator oscillates a frequency predetermined on the basis of a value corresponding to each of the antennas; and each mixer frequency-shifts the amplified signal with the oscillating signal.

2. A mobile communication system comprising a plurality of mobile stations and a base station, said base station comprising a plurality of antennas, a frequency shift portion, a combining portion, a receiving portion and a signal processing portion, wherein:

each antenna receives radio waves transmitted by the mobile stations;

the frequency shift portion shifts the received signals with a frequency corresponding to each of the antennas;

the combining portion combines the signal, which is shifted in frequency, as a combining signal;

the receiving portion converts the combining signal in frequency to make an intermediate frequency signal, and converts the intermediate frequency signal into a digital signal; and the signal processing portion comprises:

spreading demodulation means which demodulates the digital signal with spreading by the use of a spreading code that is compensated frequency shift component corresponding to each of the antennas and which makes a demodulation signal at every antenna;

judging means which specifies an arrival direction of each of the radio waves of the mobile stations on the basis of the demodulation signal and which produces the demodulation signal for each of the mobile stations; and fading compensation means which performs a RAKE combination from the demodulation signal for each of the mobile stations, wherein:

the frequency shift portion comprises a plurality of amplifiers corresponding to the antennas, a plurality of mixers, a plurality of frequency multipliers, and a single reference oscillator;

each amplifier amplifies a signal received at every antenna;

the reference oscillator oscillates a single predetermined frequency;

each frequency multiplier multiplies a reference oscillating signal with a predetermined value based upon a value corresponding to each of the antennas; and each mixer frequency-shifts the amplified signal with a multiplied signal.

3. A mobile communication system comprising a plurality of mobile stations and a base station, said base station comprising a plurality of antennas, a frequency shift portion, a combining portion, a receiving portion and a signal processing portion, wherein:

each antenna receives radio waves transmitted by the mobile stations;

the frequency shift portion shifts the received signals with a frequency corresponding to each of the antennas;

the combining portion combines the signal, which is shifted in frequency, as a combining signal;

the receiving portion converts the combining signal in frequency to make an intermediate frequency signal, and converts the intermediate frequency signal into a digital signal; and the signal processing portion comprises:

spreading demodulation means which demodulates the digital signal with spreading by the use of a spreading code that is compensated frequency shift component corresponding to each of the antennas and which makes a demodulation signal at every antenna;

judging means which specifies an arrival direction of each of the radio waves of the mobile stations on the basis of the demodulation signal and which produces the demodulation signal for each of the mobile stations; and fading compensation means which performs a RAKE combination from the demodulation signal for each of the mobile stations, wherein:

a phase difference is retained between the received signal and the demodulation signal.

4. A mobile communication system comprising a plurality of mobile stations and a base station, said base station comprising an adaptive array antenna having a plurality of antennas, a frequency shift portion, a combining portion, a single receiving portion, and a signal processing portion, wherein:

the adaptive array antenna receives radio waves transmitted by the mobile stations;

the frequency shift portion shifts the received signal with a frequency predetermined on the basis of a value corresponding to each of the antennas;

the combining portion determines the signal, which is shifted in frequency, as a single combining signal;

the single receiving portion converts the single combining signal in frequency to make an intermediate frequency signal, and converts the intermediate frequency signal into a digital signal; and the signal processing portion comprises:

spreading demodulation means which demodulates the digital signal with spreading by the use of a spreading code that is compensated frequency shift component predetermined on the basis of a value corresponding to each of the antennas and which makes a demodulation signal at every antenna;

judging means which specifies an arrival direction of each of the radio waves of the mobile stations on the basis of the demodulation signal and which produces the demodulation signal for each of the mobile stations; and fading compensation means which performs a RAKE combination from the demodulation signal for each of the mobile stations, wherein:

the frequency shift portion comprises a plurality of amplifiers corresponding to the antennas, a plurality of mixers, and a plurality of oscillators;

each oscillator oscillates a frequency predetermined on the basis of a value corresponding to each of the antennas; and each mixer frequency-shifts the amplified signal with the oscillating signal.

5. A mobile communication system comprising a plurality of mobile stations and a base station, said base station comprising an adaptive array antenna having a plurality of antennas, a frequency shift portion, a combining portion, a single receiving portion, and a signal processing portion, wherein:

the adaptive array antenna receives radio waves transmitted by the mobile stations;

the frequency shift portion shifts the received signal with a frequency predetermined on the basis of a value corresponding to each of the antennas;

the combining portion determines the signal, which is shifted in frequency, as a single combining signal;

the single receiving portion converts the single combining signal in frequency to make an intermediate frequency signal, and converts the intermediate frequency signal into a digital signal; and the signal processing portion comprises:

spreading demodulation means which demodulates the digital signal with spreading by the use of a spreading code that is compensated frequency shift component predetermined on the basis of a value corresponding to each of the antennas and which makes a demodulation signal at every antenna;

judging means which specifies an arrival direction of each of the radio waves of the mobile stations on the basis of the demodulation signal and which produces the demodulation signal for each of the mobile stations; and fading compensation means which performs a RAKE combination from the demodulation signal for each of the mobile stations, wherein:

the frequency shift portion comprises a plurality of amplifiers corresponding to the antennas, a plurality of mixers, a plurality of frequency multipliers, and a single reference oscillator;

each amplifier amplifies a signal received at every antenna;

the reference oscillator oscillates a single predetermined frequency;

each frequency multiplier multiplies a reference oscillating signal with a predetermined value based upon a value corresponding to each of the antennas; and each mixer frequency-shifts the amplified signal with a multiplied signal.

6. A mobile communication system comprising a plurality of mobile stations and a base station, said base station comprising an adaptive array antenna having a plurality of antennas, a frequency shift portion, a combining portion, a single receiving portion, and a signal processing portion, wherein:

the adaptive array antenna receives radio waves transmitted by the mobile stations;

the frequency shift portion shifts the received signal with a frequency predetermined on the basis of a value corresponding to each of the antennas;

the combining portion determines the signal, which is shifted in frequency, as a single combining signal;

the single receiving portion converts the single combining signal in frequency to make an intermediate frequency signal, and converts the intermediate frequency signal into a digital signal; and the signal processing portion comprises:

spreading demodulation means which demodulates the digital signal with spreading by the use of a spreading code that is compensated frequency shift component predetermined on the basis of a value corresponding to each of the antennas and which makes a demodulation signal at every antenna;

judging means which specifies an arrival direction of each of the radio waves of the mobile stations on the basis of the demodulation signal and which produces the demodulation signal for each of the mobile stations; and fading compensation means which performs a RAKE combination from the demodulation signal for each of the mobile stations, wherein:

a phase difference is retained between the received signal and the demodulation signal.

7. A wireless receiving device for a mobile communication system comprising a plurality of antennas, a frequency shifter, a combiner, and a receiver, wherein:

each antenna receives a signal utilized for a communication in the mobile communication system;

the frequency shifter shifts the received signal in frequency corresponding to each of the antennas;

the combiner combines the signal shifted in frequency as a combining signal; and the receiver converts the combined signal to make an intermediate frequency signal.

8. The wireless receiving device according to claim 7, wherein the wireless receiving device is a part of the mobile communication system.

9. The wireless receiving device according to claim 7, wherein the combiner combines the received signal, which are only shifted in frequency, and wherein only the combined signal is converted to the intermediate frequency.

10. A wireless receiving device for a mobile communication system comprising a plurality of antennas, a frequency shifter, a combiner, and a signal processor, wherein:

each antenna receives a signal utilized for a communication in the mobile communication system;

the frequency shifter shifts the received signal in frequency corresponding to each of the antennas;

the combiner combines the signal shifted in frequency as a combining signal; and the signal processor demodulates the signal shifted in frequency using a spreading code that is compensated for the frequency shift component corresponding to each of the antennas and which makes a demodulation signal corresponding to each of the antennas.

11. A wireless receiving device for a mobile communication system comprising a plurality of antennas, a frequency shifter, a combiner, a receiver and a signal processor, wherein:

each antenna receives a signal utilized for a communication in the mobile communication system;

the frequency shifter shifts the received signal in frequency corresponding to each of the antennas;

the combiner combines the signal sifted in frequency as a combining signal;

the receiver converts the combined signal to make an intermediate frequency signal; and the signal processor demodulates the intermediate signal using a spreading code that is compensated for the frequency shift component corresponding to each of the antennas and which makes a demodulation signal corresponding to each of the antennas.

* * * * *